Sept. 6, 1949.  S. L. BURGWIN ET AL  2,480,835
PHOTOELECTRIC CONTROL APPARATUS
Filed Dec. 10, 1946  3 Sheets-Sheet 1
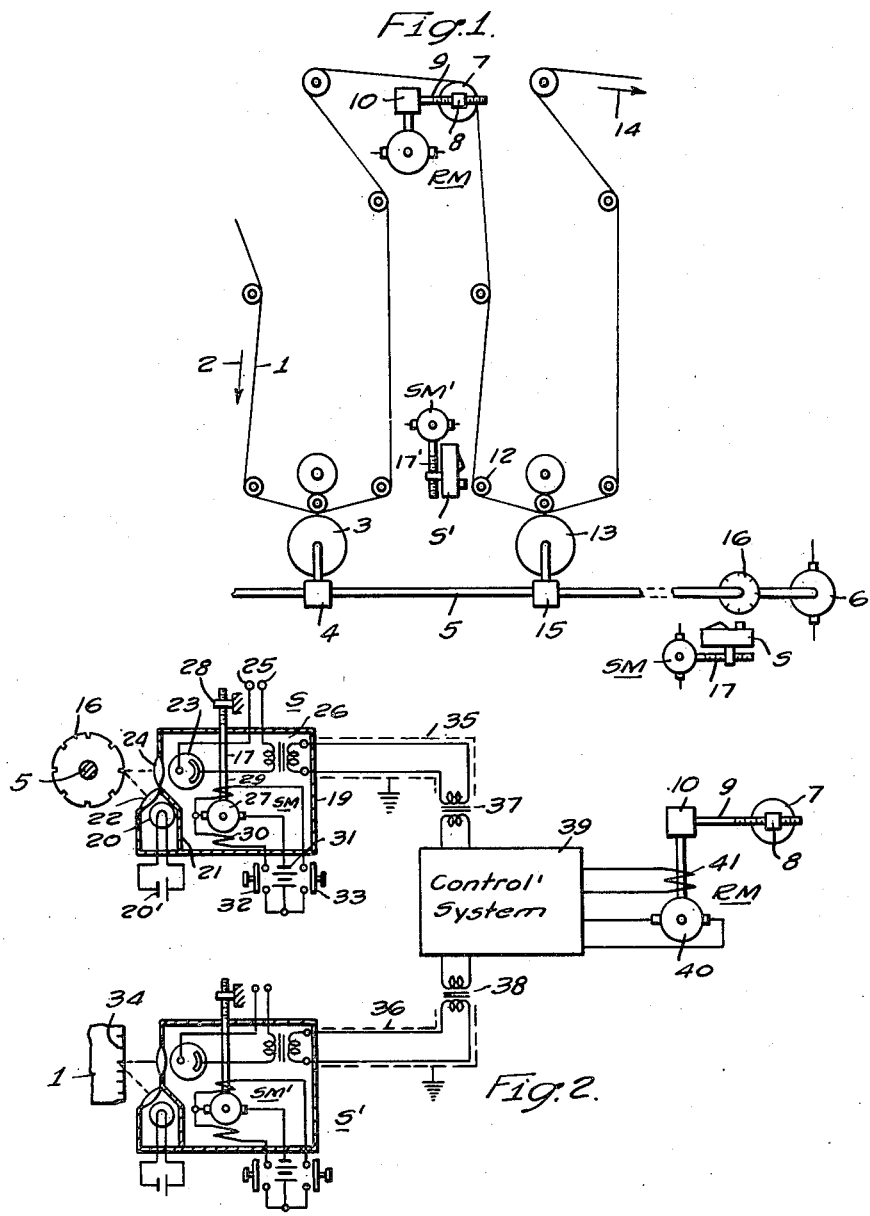
WITNESSES:
E. A. McCloskey
New Co Groome
INVENTORS
Francis T. Bailey and
Stephen L. Burgwin.
BY
Paul E. Friedemann
ATTORNEY

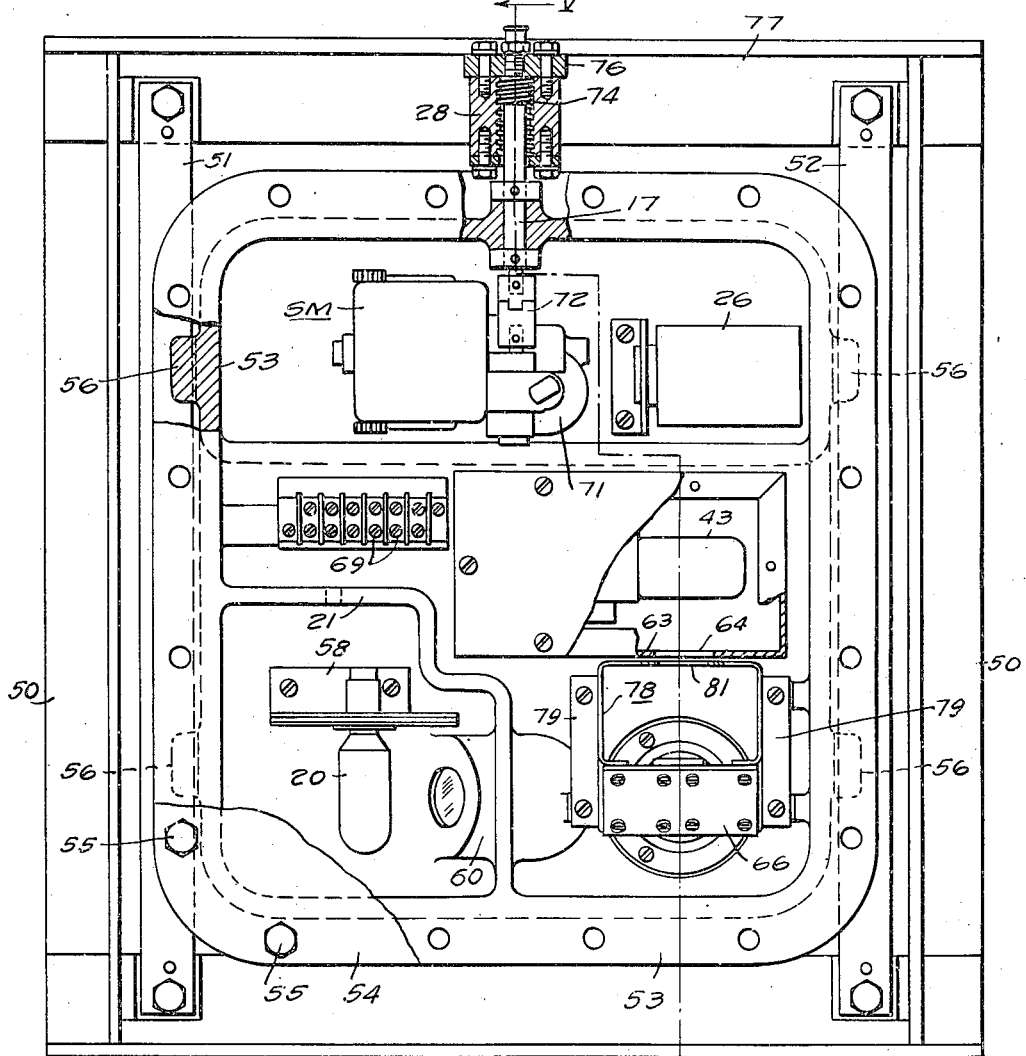
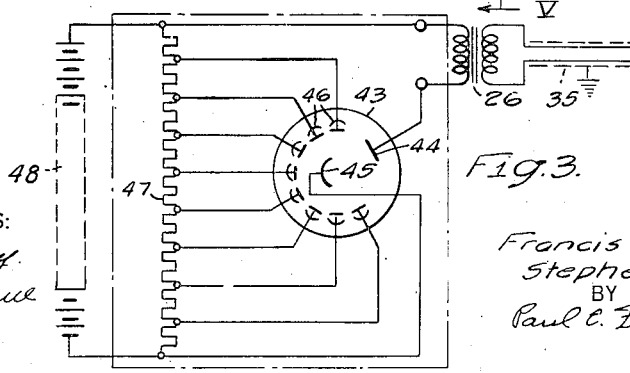

Sept. 6, 1949.  S. L. BURGWIN ET AL  2,480,835
PHOTOELECTRIC CONTROL APPARATUS
Filed Dec. 10, 1946  3 Sheets-Sheet 3
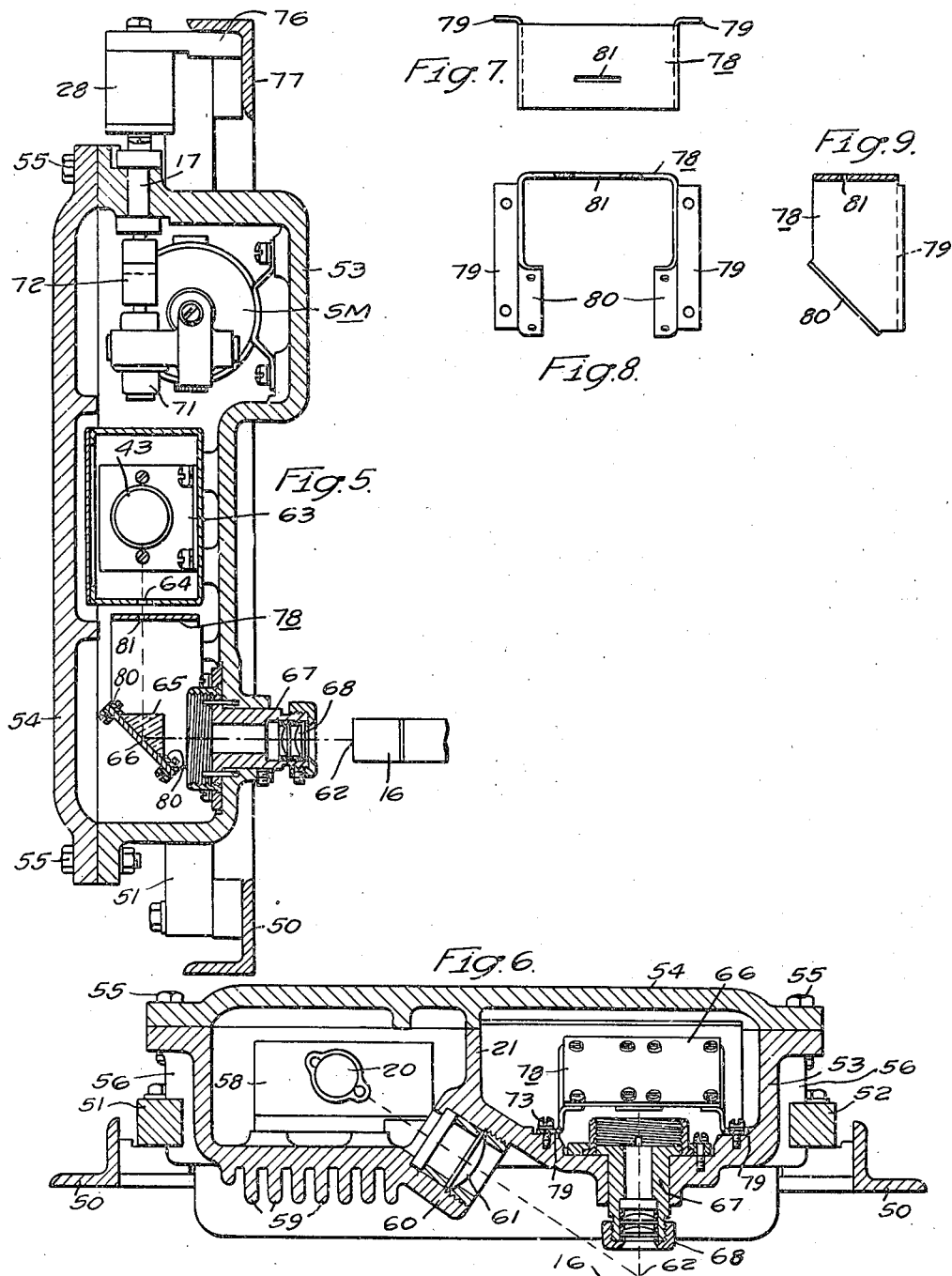
INVENTORS
Francis T. Bailey and
Stephen L. Burgwin.
BY
Paul C. Friedemann
ATTORNEY Patented Sept. 6, 1949

2,480,835

UNITED STATES PATENT OFFICE 2,480,835

PHOTOELECTRIC CONTROL APPARATUS

Stephen L. Burgwin, Forest Hills, and Francis T. Bailey, Pittsburgh, Pa., assignors to Westinghouse Electric Corporation, East Pittsburgh, Pa., a corporation of Pennsylvania Application December 10, 1946, Serial No. 715,300

10 Claims. (Cl. 250—41.5)

Our invention relates to photoelectric control apparatus for issuing or modifying electric impulses or currents in response to the passage of irregularities, interruptions, defects such as flaws, register marks or the like optical heterogeneities of a body or surface member moving in front of the apparatus. Such photoelectric apparatus are applicable in testing or counting equipment, photoelectric regulating devices for printing presses, paper cutting or slitting equipment and various other photoelectrically controlled machinery or installations.

In one of its more specific aspects, our invention relates to photoelectric scanning units for the control of register regulators for sheet or paper fabricating machinery in which the unit is to respond to periodically recurrent interruptions or register marks of a traveling surface member or web. Such scanning units, for example, are used in register regulators for multi-color printing as disclosed in our copending application Serial No. 715,299, filed December 10, 1946, or in the copending application Serial No. 715,239, filed December 10, 1946, of L. C. Poole, both applications being assigned to the assignee of the present invention.

It is an object of our invention to provide photoelectric control or sensing devices that combine a highly accurate and sensitive operation with an especially economical design, little space requirements, and improved facility of adjustment as compared with the known devices of this kind.

It is also an object of the invention to provide a photoelectric control or sensing device that includes, within a single unit, the photoelectric tube, the appertaining light source, and the adjusting devices for positioning the unit as a whole relative to the object or objects to be responded to.

Another object of the invention is to provide a photoelectric scanning device capable of accurate and sensitive response to the interruption of light reflected from a traveling surface which has recurrent register marks or interruptions.

These and other objects of the invention will be apparent from the following description of the embodiments illustrated in the accompanying drawings, in which:

Figure 1 shows schematically a section of a multi-color printing press equipped with two photoelectric control or scanning units according to the invention, for controlling the motor of a register regulating device;

Fig. 2 shows diagrammatically the two scanning units, in a somewhat modified form, in connection with the motor to be controlled thereby;

Fig. 3 is a circuit diagram of a modified form of the photoelectric cell or tube to be used in units according to the invention; and Figs. 4 through 9 show, in detail, the design of a photoelectric scanning unit as represented in the preceding figures. More in detail, Fig. 4 is a front view of the complete unit, with most of the appertaining cover removed; Fig. 5 shows a vertical section through the same unit along the sectional plane denoted in Fig. 4 by the dot and dash line marked V—V; Fig. 6 is a horizontal cross-section through the same unit, taken substantially along the optical axis of the lens system visible in Fig. 5; and Figs. 7, 8 and 9 represent three different views, respectively, of a structural part of the same unit which forms a barrier or diaphragm and serves also for supporting a prism.

The photoelectric unit illustrated in the drawings and described hereinafter is exemplified by a scanning device for a register regulator in multi-color printing. It should be understood, however, that this representation is chosen for the purpose of exemplification and illustration, and that the invention is similarly applicable to photoelectric control units for other purposes, for instance, for the differently operating control or regulating systems mentioned in the foregoing. Register regulators for multi-color printing are more fully disclosed in the above-mentioned copending applications, but will be described presently to the extent necessary for conveying a complete understanding of the present invention.

Figure 1 of the drawings shows only two of the four printing stands appertaining to a four-color printing press. In such a press, four differently colored impressions, usually yellow, red, blue and black, are superimposed on one another in order to produce an additive color print. As a rule, the yellow impression is printed first and includes a series of evenly spaced register marks on the margin of the web. These register marks are scanned by photoelectric scanning devices shortly before the web enters into each of the three subsequently operating printing presses. A master or reference transmitter is provided for issuing reference signals that occur in synchronism with, or in a given phase relation to, the printing of the register marks in the yellow press. When the impulses produced by each scanner at the red, blue and black printing stands occur simultaneously with the reference impulses, the color impression of the printing stand with which the scanner is associated is in correct register with the yellow impression. When a misregister occurs, the impulses from the color scanner are no longer in synchronism with the master or reference impulses, and this difference in timely occurrence is used to control a register correcting device.

The apparatus cooperating in the just-mentioned performance are shown in Fig. 1 for the yellow and red printing stands only. The web 1 travels from a supply reel in the direction of the arrow 2 through the yellow printing press 3. This press is driven, through a gear box 4 or the like transmission, from a line shaft 5 which is operated by a line shaft motor or prime mover 6 at substantially constant speed. After leaving the yellow printing press 3, the web travels over a roller 7 which forms part of a register regulating device. The bearing 8 of roller 7 is in threaded engagement with a shaft 9 so that the roller axis can be displaced horizontally by revolving the shaft 9. The shaft 9 is connected through a gear box 10 with a reversible register regulating motor RM. After leaving the roller 7, the web passes over a fixed roller 12 into the red printing press 13 driven through a gear box 15 from line shaft 5 and then travels in the direction of the arrow 14 to the next (blue) printing press and subsequently through the last (black) printing press toward the folding and cutting equipment. A register regulating device is provided between the red printing press and the blue printing press, and another register regulating device is disposed between the blue printing press and the black printing press. These additional register regulating devices are not illustrated because they are similar in design and arrangement to the above-described device controlled by motor RM.

As mentioned, an impulse transmitter is required to issue periodic impulses in synchronism with the printing of the yellow impression by press 3. This transmitter is shown in Fig. 1 as consisting of a photoelectric scanning unit S whose optical system is focused onto the peripheral surface of a scanning wheel 16 mounted on the line shaft 5. The peripheral wheel surface has regularly spaced slots or the like interruptions which are synchronized with the printing of the register marks in the yellow press 3. When a slot or interruption of the wheel surface passes through the scanning spot of the scanner S, a reference impulse is transmitted by this scanner, as will be explained in a later place. A scanner S can be adjusted as regards its position relative to the scanning wheel 16, by means of a motor SM which operates an adjusting screw or threaded shaft 17.

A subsidiary or color scanner S' is disposed so that its scanning spot coincides with the traveling web close to the above-mentioned fixed roller 12. The scanner S' is adjustable by means of a reversible motor SM', which drives a threaded shaft 17'. The impulses produced by the subsidiary or color scanner S' are compared with those from the master or reference scanner S in order to cause the motor RM to move in one or the other direction depending upon the occurrence and direction of any misregister between the yellow and red impressions.

While the above-mentioned master scanner S is shown to cooperate with a scanning wheel, in accordance with the above-mentioned copending application Serial No. 715,299, it should be kept in mind that, if desired, a scanning wheel can be omitted and the master scanner instead be located to be responsive to the above-mentioned register marks at a place closely behind the yellow printing press 3 relative to the traveling direction of the web 1, in accordance with the above-mentioned copending application Serial No. 715,239.

According to Fig. 2, the master scanner S for cooperating with the scanning wheel 16 on the line shaft 5, has a housing 19 equipped with a light source 20 which is energized by an extraneous current source 20' and optically separated by a partition 21 from the rest of the space in housing 19. An optical system, represented in Fig. 2 by a lens 22, throws or focuses the light of source 20 onto a scanning spot on the surface of the scanning wheel 16. Mounted in the housing 19 is further a photoelectric cell or tube 23 with an appertaining optical system shown in Fig. 2 by a lens 24. The circuit of phototube 23 is energized at terminals 25 from an extraneous current source (not shown) and includes the primary of an impedance matching transformer 26.

In distinction from the scanning units shown in Fig. 1, the unit S, as represented in Fig. 2, contains the appertaining adjusting motor SM inside the housing 19. The armature 27 of motor SM is in driving connection with the threaded shaft 17, and this shaft engages a stationary nut or the like threaded member so that the housing 19 and all parts attached thereto are moved upward when the armature 27 revolves in one direction, and downward when the armature revolves in the other direction. Motor SM has two field windings 29 and 30 connected to an extraneous current source 31 under control by normally open push-button contacts 32 and 33, respectively. The actuation of push-button 32 causes the field winding 30 to energize the motor SM for operation in one direction, while the actuation of push-button 33 causes field winding 29 to excite the motor for operation in the other direction.

The subsidiary scanner S', also shown in Fig. 2, is a duplicate of the above-described scanner S, and hence requires no further detailed description. The beam of light from scanner S', however, is directed onto the register marks 34 printed by the yellow press on the margin of the web 1.

When a surface interruption of scanning wheel 16 passes through the scanning spot of scanner S, an impulse is transmitted through the transformer 26. When a register mark passes through the scanning spot of the scanner S', an impulse is transmitted to the transformer of the subsidiary scanner. These impulses are imposed by respective shielded transmission cables 35 and 36, and by two input transformers 37 and 38, respectively, on the two input circuits of an electronic control system 39 which energizes the armature 40 and the field winding 41 of the register regulating motor RM. The control system 39 is not shown in detail because it does not form part of the present invention proper and is fully described in the above-mentioned copending applications. It suffices to state that the system operates by providing a constant excitation for either the motor armature 40 (copending application Serial No. 715,299), or the field winding 41 (copending application Serial No. 715,239), while the respective other element of the motor RM is supplied with reversible excitation depending upon the occurrence and direction of any misregister sensed by the scanners S and S'. The input section of the control system 39 connected to the two transformers 37 and 38 consists preferably of an electronic trigger tube circuit (not shown) with two mutually-interlocked trigger tubes whose respective grid circuits are controlled by the two transformers 37 and 38, respectively, so that the output voltage from the two tubes governs the resultant control voltage for motor RM as regards polarity and duration or magnitude.

While, as described, the scanners are located at different places in proximity to the apertaining sections of the printing machinery, the control system is usually located at a central place remote from the scanners. Consequently, an impulse transmission from the scanners to the control system of high fidelity is desired. As a rule, the phototubes are equipped with suitable electronic amplifying means which are also located within the housing of the respective scanners. The output circuit of such amplifying means has a high impedance as compared with the high-fidelity transmission cables, for instance, of the shielded coaxial or twisted-conductor type that are available for such purposes. For that reason, the transformer 26 and the corresponding transformers in the other scanning units are designed as step-down impedance matching transformers, while the transformers 37 and 38 are step-up impedance-matching transformers. In this manner, a transmission from the scanners to the control system of the desired high accuracy and fidelity of wave shape is secured.

The schematic illustration of Fig. 2 is simplified in not showing the amplifying means also located in the housing of the scanner units. It is preferred to combine the amplifying means with the photoelectric means of the scanner within a single electronic device by employing phototubes of the electronic multiplier type. A tube circuit of this type is shown in Fig. 3.

According to Fig. 3, the phototube 43 which combines also the amplifying means of the scanner has a collector electrode 44, a photoemissive cathode 45 and a group of multiplier electrodes 46. Phototubes of this type are known as such. They operate to amplify the electron current issued from cathode 45 by virtue of the increasing amount of secondary electrons emitted from the electrodes 46, as the electrons pass from the cathode to the first multiplier electrode 46 thence to the second and subsequent electrodes until they reach the collector electrode 44. The electrodes of tube 43 are attached to the proper potential points of the voltage divider 47 energized from an extraneous source 48 of constant voltage. With such a combined photoelectric and amplifying tube, no additional amplifying means are required so that the tube 43 can be directly connected to the impedance matching transformer 26. Thus, the application of an electrode multiplier tube contributes to achieving the desired compactness of the design aimed at by the invention.

Referring now to the more realistic and detailed showing of Figs. 4 through 6, the following design features will be noted. A rigid and substantially rectangular frame structure 50 is provided. This structure is to be firmly secured to the printing or other machinery at the place where the scanning unit is to be located. The structure 50 has two guiding bars 51 and 52 on which the housing portion 53 of the unit is slidably movable. A removable cover 54 is attached to the housing 53 by means of screws 55. The engagement of the housing 53 with the guiding bars 51 and 52 is secured by projections 56 which are integral with the housing 53. A partition 21, also integral with the housing 53, separates a relatively small chamber from the rest of the housing interior. This chamber contains a socket 58 for the light source 20. The outer surface of housing 53 is equipped with cooling ribs 59 near the place of the light source 20 in order to distribute heat. A tubular portion of housing 53 is equipped with a lens system 61 mounted in an enclosure 60 for condensing the light from source 20 and throwing it onto a scanning spot 62 on the surface of the scanning wheel 16 (or, as explained above, onto the margin of the web if the scanner is used as a subsidiary scanner).

A separate casing 63 of sheet metal is provided in the housing 53 for the reception and enclosure of the phototube 43 according to Fig. 3. The casing 63 has a slot 64 (Figs. 4, 5). Numeral 65 denotes a prism located in the optical axis of the phototube 43 by means of a suitable holder 66 for rectangular deflection of the illuminating beam of light. The housing 53 has a tubular member 67 which carries a magnifying lens system 68. The beam of light issuing from light source 20 through the lens system 61 and reflected from the surface of the scanning wheel (or web) at the scanning spot 62 (Fig. 6), enters through the lens system 68 (Fig. 5) to be deflected by the prism 65 onto the cathode of the phototube 43.

A series of terminals 69 is located next to the casing 63 of the phototube. The leads (not shown in Figs. 4 through 6) from the individual electric elements of the scanner unit are attached to the terminals for connection to the outside current sources and transmission circuit.

The above-mentioned impedance transformer 26 is located in the upper portion of the housing 53 (Fig. 4) next to the adjusting motor SM. This motor is equipped with a reducing gear 71 whose output shaft is connected by a clutch 72 with the threaded shaft 17. The stationary threaded member 28, which engages the threaded portion 74 of shaft 17, is firmly secured to an abutment 76 mounted on a cross member 77 of the above-mentioned stationary frame structure 50 (Figs. 4, 5). Consequently, as explained above, the motor SM will slide the housing 53 and all parts attached thereto along the bars 51 and 52 in the upward direction when one of the motor field windings is energized, and it will lower the housing 53 relative to the frame structure 50 if the other motor field winding is excited. In this manner, the scanning spot of the scanning unit can be adjusted and calibrated as regards its position relative to the movable surface whose optically effective interruptions are to be responded to.

The above-mentioned prism 65 is mounted on a structure 78 which is separately illustrated in Figs. 7, 8 and 9, and serves also as an opaque barrier or diaphragm in the path of the light beam illuminating the phototube 43. The structure 78 has two flanges 79 with which it is attached to the housing 53 (Figs. 4, 6). Two further flanges 80 are provided for supporting the mounting plate 66 of the prism 65. A narrow slot 81 forms the diaphragm aperture of the structure 78. This slot is located in front of the cathode area of the phototube 43 immediately before the cathode window 64 of the enclosure 63 so that the only light permitted to illuminate the multiplier tube 43 must pass through the slot 81. The optical system 68 (Figs. 5, 6) is so focused onto the surface interruptions (or register marks) that a magnified image of the interruptions (or marks) is produced substantially in the plane of the slot 81, and this slot is so shaped that it is substantially, or fully, covered by the magnified image at the moment an interruption (or mark) passes through the scanning spot of the unit. The optical system 68 may have a magnification factor of approximately six, for instance; and the slot aperture of the diaphragm or barrier may then be about six times as large as the surface interruptions (or register marks) to be responded to. For the purposes of multi-color register regulation for instance, the slot may have a length of 1 inch and a width of $\frac{1}{32}$ inch. Due to the covering of the slot by a passing surface interruption (or register mark), the phototube is virtually blacked out for a moment so that a maximum change in received light intensity, and hence a maximum change in output voltage, is secured. Phototubes of the types preferable for multi-color register regulators have their highest sensitivity in the blue range of the spectrum. Consequently, the appearance of a yellow image covering the diaphragm aperture represents in fact a very substantial "darkening" or virtual blacking out of the tube.

It will be recognized from the foregoing that photoelectric control or scanning apparatus according to the invention can be designed as a single unit of extreme compactness which includes all elements and devices for adjustment and operation, and that such units secure an accurate and stable relationship between the luminating light source, the phototube and all optical elements appertaining thereto, because all of these elements are moved in a fixed relation to one another when the position of the unit is changed by the adjusting means. In photoelectrical and electrical respects, a high sensitivity and accuracy is secured by the provision of an apertured diaphragm coverable by the magnified image of the optical surface irregularity to be responded to and also by the provision in the unit of an impedance matching transformer so that it is merely necessary to connect a transmission cable to the output terminals of the photoelectric tube circuit. The invention offers also the advantage of a highly simplified installation because it is merely required to mount the unit as a whole and to attach to its terminals the extraneous circuit connections, all internal connections forming an integral part of the unit and being enclosed in its housing.

It will be obvious to those skilled in the art that photoelectric control units according to the invention can be modified and altered in various respects, especially as regards its individual elements and components, and their design and arrangement, without departing from the advantages and essential features of the invention and within the scope of the claims annexed hereto.

We claim as our invention:

1. A photoelectric control unit, comprising a support, a light source and a phototube mounted on said support for illumination of said tube by reflected light from said source, adjusting means disposed on said support for displacing said support relative to a stationary reference, and a reversible motor mounted on said support in driving relation with said adjusting means for actuating the latter.

2. A photoelectric control unit, comprising a movable support, a light source on said support, a phototube and optical means mounted on said support for illumination of said tube through said optical means by reflected light from said source, gear means movably mounted on said support for moving said support when actuated, and an electric motor mounted on said support in driving connection with said gear means for actuating the latter.

3. A photoelectric control unit, comprising a frame structure, a support guided by said structure so as to be displaceable relative thereto, a light source and a phototube mounted on said support for illumination of said tube by reflected light from said source, an adjusting member movably mounted on said support and engaging said frame structure for displacing said support when actuated, and an electric motor mounted on said support in driving connection with said adjusting member.

4. A photoelectric control unit, comprising a frame structure for stationary mounting, a housing engaging said frame structure and being displaceable relative to said structure, a light source and appertaining focusing means mounted in said housing, a phototube and an appertaining optical system mounted in said housing for illumination of said tube by exteriorly reflected light from said source, adjusting means having two parts in threaded engagement with each other, one of said parts being mounted on said frame structure and the other being revolvably secured to said housing, and reversible electric drive means mounted in said housing and connected to said other part for revolving the latter.

5. A photoelectric scanning unit, for response to recurrent interruption of a traveling reflective surface, comprising a housing, a light source disposed in said housing for illuminating the traveling surface, a phototube disposed in said housing, an optical magnifying system disposed in said housing in front of said tube, and an opaque diaphragm disposed in said housing between said optical system and said tube and having an aperture shaped to be completely coverable by the magnified image of the interruptions so that said tube is momentarily blacked out by the passage of an interruption.

6. A photoelectric scanning unit, for response to recurrent interruptions of a moving surface, comprising a housing, a phototube in said housing, a magnifying optical system disposed in front of said tube, an opaque diaphragm disposed in said housing between said tube and said system and having an aperture shaped to be completely coverable by the magnified image of the interruptions so that said tube is blacked out momentarily during the passage of the interruptions.

7. A photoelectric scanning unit, for response to recurrent interruptions of a moving surface, comprising a housing, an optical system attached to said housing and having a focal scanning spot outside said housing, electronic means disposed within said housing and including therein a photosensitive electrode disposed to be illuminated through said optical system and amplifying means for issuing electric impulses in response to the passage of the surface interruptions through said spot, and a step-down impedance-matching transformer also mounted in said housing and having secondary terminals for connection to a transmission line.

8. A photoelectric scanning unit, for response to recurrent interruptions of a moving surface, comprising a housing, an optical system attached to said housing and having a focal scanning spot outside said housing, an electron multiplier phototube disposed in said housing to be illuminated through said optical system for issuing electric impulses in response to the passage of the surface interruptions through said spot, and an impedance step-down transformer disposed in said housing and connected to said tube.

9. A photoelectric scanning unit, for response to optically effective irregularities of a moving surface, comprising a frame structure for stationary mounting, a housing slidably engaging said structure to be displaceable relative thereto, a light source in said housing, a lens system disposed relative to said light source so as to focus the latter onto a scanning spot outside the housing, a photoelectric tube disposed in said housing, partition means in said housing to separate said tube from said light source, a second lens system attached to said housing and substantially focused onto said spot, a prism disposed in said housing to guide reflected light from said source onto said tube, said partition means having an opening in front of said tube for the passage of said reflected light, a motor disposed in said housing, and adjusting means having a movable member controlled by said motor and engaging said structure for displacing said housing in order to adjust said scanning spot.

10. A photoelectric scanning unit, for response to recurrent interruptions of a moving surface, comprising a frame structure for stationary mounting, a housing slidably engaging said structure to be displaceable relative thereto, a light source in said housing, a lens system disposed relative to said light source so as to focus the latter onto a scanning spot outside the housing, a photoelectric tube and appertaining electric circuit means disposed in said housing, said circuit means comprising an output transformer having secondary terminals for the connection of the unit to a circuit to be controlled by the unit, partition means in said housing to separate said tube from said light source, a second lens system attached to said housing and substantially focused onto said spot, a prism disposed in said housing to guide reflected light from said source onto said tube, said partition means having an opening in front of said tube for the passage of said reflected light, an opaque diaphragm having an aperture shaped to be completely coverable by the magnified image of the interruptions, a motor disposed in said housing, and adjusting means having a movable member controlled by said motor and engaging said structure for displacing said housing in order to adjust said scanning spot.

STEPHEN L. BURGWIN.
FRANCIS T. BAILEY.

REFERENCES CITED

The following references are of record in the file of this patent:

UNITED STATES PATENTS

| Number | Name | Date |
|---|---|---|
| 1,227,292 | Mills | May 22, 1917 |
| 1,807,602 | Radford | June 2, 1931 |
| 1,917,379 | Lowry | June 11, 1933 |
| 2,091,303 | Brelsford | Aug. 31, 1937 |
| 2,290,775 | Snyder, Jr. | July 21, 1942 |
| 2,329,818 | Brackett | Sept. 21, 1943 |
| 2,348,862 | Sorkin | May 16, 1944 |